Feb. 7, 1956

R. B. BARNES 2,734,142

CATHODE RAY TUBES

Filed Sept. 7, 1950

INVENTOR
ROBERT BOWLING BARNES

BY
*Louis L. Gagnon*
ATTORNEY

United States Patent Office 2,734,142
Patented Feb. 7, 1956

2,734,142
CATHODE RAY TUBES

Robert Bowling Barnes, Stamford, Conn., assignor to American Optical Company, Southbridge, Mass., a voluntary association of Massachusetts Application September 7, 1950, Serial No. 183,548

9 Claims. (Cl. 313—92)

This invention relates to improvements in devices of the type wherein illuminated images are produced on a viewing screen and relates particularly to the provision of novel means of improving the observation qualities of said images.

One of the principal objects of the invention is to provide novel means of reducing halation, eliminating specular reflection, reducing surface reflections, and introducing an overall increase in the contrast discrimination of the images produced in devices of the type for producing illuminated images on the viewing screen.

Another object is to provide a cathode ray tube with a meniscus shaped zero power lens attached to the outer surface of the tube face, said lens having a superficial reflection-reduction coating on its outer surface for reducing reflections back toward the fluorescent screen of light emitted by the screen and striking the outer surface of the tube face and for simultaneously reducing reflections into an observer's eyes of light emanating from sources outside the tube.

Another object is to provide a cathode ray tube of the above character wherein the lens is attached to the tube face by a cementitious material having ultra-violet ray absorbing characteristics.

Another object is to provide a tube of the above character wherein the cementitious material bonding the lens to the tube face may have incorporated therein an ingredient for darkening the tube face and further improving contrast discrimination of the image.

Another object is to provide novel means of converting so-called "white face" television tubes to what are known as "black face" tubes by the provision of lenses of the character aforesaid having a slight blue green or neutral gray color to aid in increasing contrast discrimination in the image without materially affecting the color of the image, and which may further have ultraviolet and X-ray absorbing characteristics for protecting the observer from certain undesirable rays which might emanate from the tube.

A further object is to provide a tube of the above character wherein a sheet of thin transparent plastic material may be interposed between the face of the tube and the lens for aiding in protection against implosion in the manner of conventional safety glass.

Figure 1:
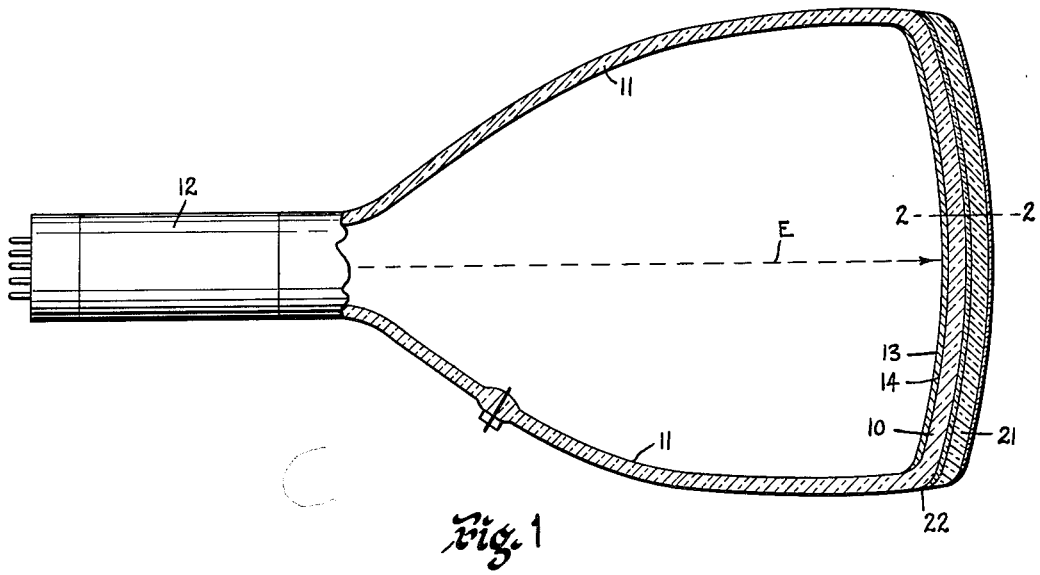
Figure 2:
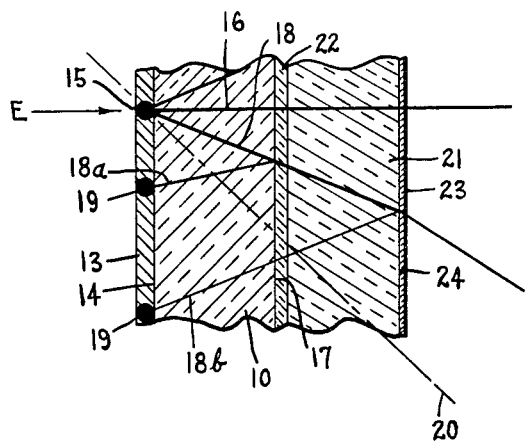

Other objects and advantages of the invention will become apparent from the following description taken in connection with the accompanying drawing, in which:

Fig. 1 is a side elevational view partly in section of a cathode ray tube embodying the invention; and Fig. 2 is a fragmentary sectional view taken on line 2—2 of Fig. 1.

It is known that application of a reflection-reduction coating to a transparent article will improve the transmission of light through the article. The present invention relates to means and method of efficiently improving contrast discrimination in an image produced on a fluorescent screen of a cathode ray tube by use of a reflection-reduction coating for reducing undesirable reflections back onto the fluorescent screen of light rays emanating from the fluorescent screen. Such reflections will cause undesired illumination of adjacent areas of the screen, creating what is known as "halation," which greatly impairs contrast discrimination of the image.

There are several difficulties which must be overcome, however, in attempting to apply a reflection-reduction coating directly upon the tube face. One difficulty is that of the large size of some of the tubes which prevent them from being inserted within some types of vacuum chambers in which the coating is to be deposited on the tube by conventional vacuum evaporation processes. In cases where the coatings are to be applied by spinning processes, the large sizes of some of the tubes also prevent them from being efficiently handled so that the coatings may be properly deposited on the face portions thereof. Such operations are also difficult and quite hazardous because of the high vacuum in such tubes and which introduces the constant danger of implosion which might occur during such treatment.

The present invention further relates to novel means and method of minimizing the above problems by the provision of a simple meniscus-shaped zero-power lens of the proper diameter which is ground and polished or otherwise shaped to the approximate configuration of the tube face. Such lenses, due to greater ease of handling, can be coated very simply and inexpensively using either the spinning methods of solution deposition or the vacuum evaporation methods. Once coated, the lenses could be bonded to the faces of the tubes with a suitable cement which would preferably possess the same index of refraction as the glass of the tubes. In this way, a good reflection-reduction coating can be easily applied and the problem of poor optical surfaces would be greatly improved upon. The additional lens also functions as added protective means for the face of the tube and can, as will be set forth hereinafter, be made to possess other desirable characteristics.

Referring more particularly to the drawing wherein like characters of reference designate like parts throughout the several views, Fig. 1 illustrates a cathode ray tube embodying a transparent face portion 10, conical side walls 11, and a neck portion 12. The side walls 11 may be formed either of glass or metal as desired. The neck portion 12 contains a conventional electron discharge device (not shown) which is adapted to direct a beam of electrons E toward the face portion 10 so that the electrons will engage a fluorescent screen 13 deposited by conventional methods upon the inner surface 14 of the face portion 10.

The fluorescent screen 13 is formed of a plurality of tiny particles each of which is capable of fluorescing when contacted by the electron beam E.

In conventional tube construction, when a fluorescent particle, illustrated diagrammatically by numeral 15 in Fig. 2, is contacted by the electron beam E, it will fluoresce and emit light rays. Light rays 16 which pass from the particle 15 through the glass in paths normal to the plane of the surfaces of the glass will emerge from the outer surface 17 of the glass substantially unaltered.

Light rays 18 traveling through the glass and striking the outer surface 17 thereof at angles less than the critical angle which is indicated by the dot-dash line 20 in Fig. 2, will normally be reflected back through the glass toward the screen 13, as indicated at 18a, in amounts in accordance with the angle at which they strike the surface 17, and will thus illuminate other particles 19 of the fluorescent screen 13 in what might otherwise be dark areas of the image. This undesirable illumination is known as "halation" and is objectionable since it tends to impair contrast discrimination in the image produced on the screen 13.

The present invention, in overcoming the above objections, provides a meniscus-shaped zero-power lens 21 which is shaped substantially to the diameter and surface configuration of the outer surface 17 of the face portion 10. The lens 21 will preferably possess substantially the same index of refraction as the glass forming the face portion 10, and is attached to the surface 17 by a suitable adhesive material 22.

Such a lens 21, due to its less bulky nature in comparison to the tube, can be easily inserted in a vacuum chamber whereby a vacuum evaporation method can be employed to deposit a reflection-reduction coating 23 on the outer surface thereof. The size factor also aids in efficient support of the lens 21 whereby the spinning methods of reflection reduction solution deposition can be employed for efficiently and easily depositing a reflection-reduction coating 23 thereon.

Although any known efficient reflection-reduction coating can be used, a preferable coating comprises submicroscopic, discrete, micro-granular, transparent, solid particles which are deposited by a spinning process on the lens 21 so as to form minute projecting irregularities on the surface, the concentration of the particles in the irregularities decreasing from the surface of the lens outwardly, and the material of the particles being such that the effective index of refraction of the coatings varies substantially from unity at the coating-air interface to an index value which progressively increases as it approaches the surface of the lens until it substantially approximates the index of refraction of the glass of said lens.

Such a reflection reduction coating does, however, possess a slight color which may not be desirable when forming lenses for color photography, color television filters, or for other uses wherein it is desired to transmit light without substantially altering the spectral transmission. In such instances the surface 24 of the lens 21 is initially provided with a color neutralizing layer and the reflection reduction coating is subsequently applied thereon as described.

The color neutralizing layer is a low index material of a thickness of approximately one-fifth of a wave length of the transmitted light and which may be deposited by spinning methods, with the actual index of refraction being controlled in accordance with the index of refraction of the material of the lens being coated. For example, a substratum of ordinary crown glass having an index of refraction between 1.50 and 1.52 will be initially provided with a coating of a solution containing controlled amounts of tetraethylorthosilicate, ethyl acetate, hydrochloric acid and ethyl alcohol, the substratum spun to properly apply the solution, and evaporation allowed to take place whereupon the resultant coating will be in the form of a silica layer which has an index of refraction of approximately 1.45. When the substratum has an index of refraction greater than 1.52, the color neutralizing layer must be accordingly increased. This can be done by incorporating in the silica layer a small amount of higher index material such as titanium dioxide, tin oxide or tungsten oxide, which higher index material is included in the original solution and remains with the silica after evaporation has taken place.

The combined color neutralizing layer and reflection-reduction coating will substantially reduce reflections from the surface 24 and permit transmission of light through the lens 21 with substantially no change in the spectral transmission.

Although the auxiliary lens 21 has been described as having a reflective surface treated with a non-reflective coating, the said reflective surface may be initially treated to provide it with light-diffusing characteristics. This may be accomplished either by acid etching, sand blasting, or by dropping the lens to shape on a mold surface of a controlled roughened texture. Such treated surfaces will prevent the formation of specularly reflected images by causing light coming from a given source externally of the tube, and impinging upon said surface, to be so diffused that no isolated bright spots will be visible. While a surface of the above character will reduce or eliminate specularly reflected images, such surfaces do have a tendency to decrease contrast discrimination of image. This, however, is overcome by applying, to said diffusing surface, a reflection-reduction coating of the type previously specified herein. Such reflection-reduction coatings, while reducing surface reflections, also tend to darken the diffusing surface and thereby increase contrast discrimination in the resultant image.

The adhesive 22 for bonding the lens 21 to the face portion 10 may be any cementitious material possessing substantially the same index of refraction as the glass, and which is transparent, substantially colorless, and stable such as Canada balsam. However, since it is believed that some cathode ray tubes emit ultra-violet rays which are objectionable in that they tend to raise the threshold of vision of an observer, it may be desirable that the adhesive possess ultra-violet absorption. A preferred cement can be produced by forming a composition containing 10%–20% of rosin, 20%–50% of chlorinated paraffin wax, 5%–10% of phenyl salicylate, and 20%–60% of a thermosetting resin such as polyethylene glycol dimethacrylate.

As an example, a satisfactory cement is made by melting approximately 13.2% of rosin, adding thereto approximately 39.5% of chlorinated paraffin wax and approximately 7.8% of phenyl salicylate, thoroughly mixing these ingredients and cooling the mixture, and subsequently adding to the cooled mixture approximately 39.5% of polyethylene glycol dimethacrylate which is then thoroughly mixed. After introducing a catalyst such as tertiarybutyl hydroperoxide or benzoyl peroxide to start reaction of the ingredients with one another the cement is ready for use in bonding the lens 21 to the face portion 10. This cement will permit ultra-violet transmission of approximately 5% at 350 millimicrons in the spectrum and less at shorter wavelengths, and further possesses the above desired characteristics.

A coated lens 21 when attached to the face portion 10 of the tube greatly increases contrast discrimination of the image produced on the fluorescent screen 13 by reducing halation. The light rays 18 pass through the face portion 10, adhesive 22, and lens 21 and upon striking the outer surface 24 of the lens 21 emerge therefrom in substantially large amounts with a consequent decrease in the reflected light rays 18b as compared with normal reflections 18a. Consequently, fluorescent particles 19 are illuminated considerably less normally, thereby reducing undesirable halation, and increasing contrast discrimination in the image.

In addition, it is pointed out here that the coating 23 also prevents reflection into an observer's eyes of light rays striking the tube face portion from sources outside the tube. This feature is particularly desirable since it considerably improves the visibility of the image. Since it is known that a so-called "black" tube such as used in television receivers provides an image having improved contrast discrimination due to the inclusion of certain coloring ingredients in the batch from which the resultant "black" glass is made, it is desirable to provide the lens 21 with similar characteristics. A glass of this type can be made, for example, from a batch formula comprising 60%–72% of silica, 14%–20% of alkali (soda and potash), 9%–11% of lime and lead, 0% to 7% of boric acid, .5% to 2% of a fining agent such an antimony, 0.4%–1.4% of manganese and 0.05%–0.15% of vanadium. When produced in accordance with known glassmaking procedures such a glass will possess the desired color. The preferable color is a bluish-green or neutral gray and is decidedly advantageous since it will aid in increasing contrast discrimination in the image by absorbing glare and reducing diffusion of the light emanating from the tube as it passes through the glass. The color should be so slight, however, that it has substantially no altering effect on the color of the image. A preferred glass, for example, having the desired color characteristics can be produced by incorporating in a glass batch ingredients in accordance with the following specific formula: 67.8% of silica, 4% of boric acid, 9% of soda, 7% of potash, 7% of lime, 3% of lead, 1.5% of antimony, 0.6% of manganese, and 0.15% of vanadium. To produce the preferred glass from the foregoing batch mixture, the mixture may be melted under oxidizing conditions at temperatures held between 2635–2700° F. for 1¼ hours, and the resultant glass will have transmission in the visible spectrum of from 45% to 70% at 400 millimicrons wave length, 58% to 76% at 500 millimicrons, 50% to 71% at 600 millimicrons, and 67% to 80% at 700 millimicrons.

Such a glass will also possess ultra-violet absorption whereby it will not be necessary to use an ultra-violet absorbing adhesive layer 22. Thus the threshold of vision of an observer will be maintained at substantially the normal level. A glass formed in accordance with the above will also absorb X-rays and thereby prevent such rays from reaching the eyes of an observer.

By attaching a "black" lens 21 to a conventional "white" tube it is possible to provide the tube with all the advantages of a "black" tube, and by also providing the lens 21 with the reflection-reduction coating as aforesaid still further improvements will result as described.

Protection from implosion can be provided by inserting a thin transparent sheet of plastic material, such as cellulose acetate, between the lens 21 and face portion 10, with the entire assembly being bonded together. In such a case, the sheet of plastic may be provided with the desired ultra-violet and visible absorption characteristics.

For example, a substantially neutral grey filter can be formed by immersing a sheet of cellulose acetate, cellulose butyrate, polyvinyl chloride or other plastic, in a solution containing amino hydroquinone diethyl ether dissolved in an organic solvent, drying, immersing in a second solution containing a soluble copper salt dissolved in an organic solvent, and subsequently drying. The concentration of ingredients placed in the solvents will be dependent upon the time cycle of immersion and density and color characteristics desired of the resultant material. A cellulose acetate film, for example, of a thickness of about 0.040" may be immersed for 3 minutes in a first solution containing 1000 ccs. of alcohol and 6.25 grams of amino hydroquinone diethyl ether, allowed to thoroughly dry, subsequently immersed in a second solution containing 1000 ccs. of alcohol and 25 grams of cupric chloride for a length of time sufficient to complete the reaction between the ingredients in the solutions, and then allowed to thoroughly dry. The film will then possess a substantially neutral grey color such as can be illustrated by a visual transmission chart having a substantially level curve throughout the visible spectrum with the exception of the red portion which is greatly cut off to indicate considerably less transmission in this region. The ultra-violet transmission of this film will be about 6% at 360 millimicrons and less at shorter wave lengths. Such a neutral colored filter will obviate the necessity for providing the lens 21 with the color characteristics.

Although the invention has been described as an auxiliary lens which may be applied to the face of a cathode ray tube in order to introduce the various features set forth above, it is to be understood that such a lens, or a screen having similar characteristics, may be employed with various different arrangements wherein increase in contrast discrimination of image, specular reflection and reflection-reduction in general is desired. While the present invention illustrates and sets forth only one particular arrangement wherein many beneficial results have been obtained, it is not intended, however, that the said invention be limited only to the specific use set forth herein.

From the foregoing, it will be seen that all of the objects of the invention have been accomplished. While the novel features of the invention have been shown and described and are pointed out in the annexed claims, it is to be understood that many changes may be made in the details shown and described without departing from the spirit of the invention, and it is, therefore, not desired that this invention be limited to the exact details shown and described as the preferred only are set forth by way of illustration.

I claim:

1. A cathode ray tube embodying a transparent face portion having a fluorescent screen adjacent its inner surface, electron discharge means for directing a beam of electrons onto said fluorescent screen to produce a luminous spot thereon, and a transparent cover element disposed over said face portion and having an outer surface which would normally reflect light rays from said luminous spot back to the screen so as to re-illuminate portions thereof, and a transparent reflection-reduction and light-transmission increasing coating on said surface for reducing surface reflections from an external source of illumination and for simultaneously increasing transmission of said light rays emitting from said luminous spot through the outer surface of said element whereby undesirable illumination of said fluorescent screen by said light rays which would otherwise be reflected back by said surface to the screen is substantially reduced and the contrast discrimination of an image produced on said tube surface by said luminous spot is greatly improved, said transparent coating comprising a thin layer of sub-microscopic, discrete, micro-granular, transparent solid particles forming minute irregularities on said outer surface, the concentration of said particles in the irregularities decreasing from said outer surface outwardly and the material of said particles being such that the effective index of refraction of said coating varies substantially from unity at the coating-air interface to an index value which progressively increases in a direction inwardly of said coating and approaches the index of refraction of the material of the cover element.

2. A cathode ray tube embodying a transparent face portion having a fluorescent screen adjacent its inner surface, electron discharge means for directing a beam of electrons onto said fluorescent screen to produce a luminous spot thereon, and a transparent cover element of substantially the same index of refraction as the tube face portion having its inner surface shaped substantially to and bonded with the outward side of said tube face portion by a thin layer of transparent adhesive material having a similar index of refraction as the cover element and tube face portion, the outer surface of said cover element normally reflecting back to the fluorescent screen, to re-illuminate the same, those light rays emitted by the luminous spot on said fluorescent screen and striking the outer surface of said cover element at angles less than the critical angle, and a relatively thin transparent reflection-reduction and light-transmission increasing coating on said outer surface of the cover element having its characteristics so controlled as to reduce reflection of light from sources outside the tube and to simultaneously increase transmission of said light rays emitted by said luminous spot and striking the outer surface of the cover element at angles less than the critical angle whereby a large portion of said light rays will pass through said coated surface and re-illumination of the fluorescent screen by reflection is reduced and contrast discrimination of an image formed by the luminous spot is thereby greatly improved.

3. A cathode ray tube embodying a transparent face portion having a fluorescent screen adjacent its inner surface, electron discharge means for directing a beam of electrons onto said fluorescent screen to produce a luminous spot thereon, and a transparent cover element of substantially the same index of refraction as the tube face portion having its inner surface shaped substantially to and bonded with the outward side of said tube face portion by a thin layer of transparent adhesive material having a similar index of refraction as the cover element and tube face portion, the outer surface of said cover element approximately paralleling the inner surface thereof, said outer surface normally reflecting back to the fluorescent screen, to re-illuminate the same, those light rays emitted by the luminous spot on said fluorescent screen and striking the outer surface of said cover element at angles less than the critical angle, and a relatively thin transparent reflection-reduction and light-transmission increasing coating on said outer surface of the cover element having its characteristics so controlled as to reduce reflection of light from sources outside the tube and to simultaneously increase transmission of said light rays emitted by said luminous spot and striking the outer surface of the cover element at angles less than the critical angle whereby a large portion of said light rays will pass through said coated surface and re-illumination of the fluorescent screen by reflection is reduced and contrast discrimination of an image formed by the luminous spot is thereby greatly improved.

4. A cathode ray tube embodying a transparent face portion having a fluorescent screen adjacent its inner surface, electron discharge means for directing a beam of electrons onto said fluorescent screen to produce a luminous spot thereon, and a transparent cover element of substantially the same index of refraction as the tube face portion having its inner surface shaped substantially to the outward side of said tube face portion, a thin transparent sheet of plastic material inserted between the tube face and the cover element, said cover element and thin sheet of plastic material being bonded to each other and to said outward surface of the tube face portion by a thin layer of transparent adhesive material having a similar index of refraction as the cover element and tube face portion, the outer surface of said cover element normally reflecting back to the fluorescent screen, to re-illuminate the same, those light rays emitted by the luminous spot on said fluorescent screen and striking the outer surface of said cover element at angles less than the critical angle, and a relatively thin transparent reflection-reduction and light-transmission increasing coating on said outer surface of the cover element having its characteristics so controlled as to reduce reflection of light from sources outside the tube and to simultaneously increase transmission of said light rays emitted by said luminous spot and striking the outer surface of the cover element at angles less than the critical angle whereby a large portion of said light rays will pass through said coated surface and re-illumination of the fluorescent screen by reflection is reduced and contrast discrimination of an image formed by the luminous spot will be greatly improved.

5. The combination of a cathode ray-type television tube embodying a transparent face portion having a fluorescent screen adjacent its inner surface, electron discharge means for directing a beam of electrons onto said fluorescent screen to produce luminous spots thereon, and a meniscus-shaped substantially zero-power cover element on the face of said tube, said cover element being formed of transparent material of substantially the same index of refraction as the tube face portion, said cover element being bonded to said face portion by means of a layer of transparent adhering material disposed between said cover element and the face portion and having an index of refraction similar to that of said face portion and cover element, the outer surface of said cover element which normally reflects back to the screen light rays emitting from said luminous spots and striking said outer surface at angles less than the critical angle having a transparent light-reflecting and light-transmission increasing coating thereon, said coating having its characteristics so controlled as to reduce reflection of light from sources outside the tube and to simultaneously increase transmission of the light rays emitting from said luminous spots through said surface and thereby reducing their reflection back to the fluorescent screen whereby undesirable illumination of said fluorescent screen and halation resulting therefrom is greatly reduced and the contrast discrimination of an image produced by said luminous spots on said tube face portion is greatly improved.

6. An article for use with a device of the type for producing illuminated images, said article being adapted to be positioned for viewing said images therethrough and comprising a relatively thin sheet of glass resulting from the heat joining of from 60% to 72% of silica, 14% to 20% of alkali, 9% to 11% of lime and lead, 0% to 7% of boric acid, 0.5% to 2% of a fining agent, 0.4% to 1.4% of manganese oxide, and 0.05% to 0.15% of vanadium oxide that is ultra-violet and X-ray absorbing, transparent and neutral gray in color.

7. An article for use with a device of the type for producing illuminated images, said article being adapted to be positioned for viewing said images therethrough and comprising a relatively thin sheet of glass resulting from the heat joining of from 60% to 72% of silica, 14% to 20% of alkali, 9% to 11% of lime and lead, 0% to 7% of boric acid, 0.5% to 2% of antimony oxide, 0.4% to 1.4% of manganese oxide, and 0.05% to 0.15% of vanadium oxide that is ultra-violet and X-ray absorbing, transparent and neutral gray in color, said glass having a light diffusing surface on one side thereof.

8. An article for use with a device of the type for producing illuminated images, said article being adapted to be positioned for viewing said images therethrough and comprising a relatively thin sheet of glass resulting from the heat joining of from 60% to 72% of silica, 14% to 20% of alkali, 9% to 11% of lime and lead, 0% to 7% of boric acid, 0.5% to 2% of antimony oxide, 0.4% to 1.4% of manganese oxide, and 0.05% to 0.15% of vanadium oxide that is ultra-violet and X-ray absorbing, transparent and neutral gray in color, said glass having a reflection reduction coating on a side surface thereof.

9. A article for use with a device of the type for producing illuminated images, said article being adapted to be positioned for viewing said images therethrough and comprising a relatively thin sheet of glass resulting from the heat joining of from 60% to 72% of silica, 14% to 20% of alkali, 9% to 11% of lime and lead, 0% to 7% of boric acid, 0.5% to 2% of a fining agent, 0.4% to 1.4% of manganese oxide, and 0.05% to 0.15% of vanadium oxide that is ultra-violet and X-ray absorbing, transparent and neutral gray in color, said glass having a light diffusing surface on one side thereof and a reflection reduction transmission increasing coating on said light diffusing surface.

References Cited in the file of this patent

UNITED STATES PATENTS

| Number | Name | Date |
|---|---|---|
| 1,292,148 | Taylor | Jan. 21, 1919 |
| 2,090,922 | Von Ardenne | Aug. 24, 1937 |
| 2,093,288 | Ogloblinsky | Sept. 14, 1937 |
| 2,197,625 | Teves et al. | Apr. 16, 1940 |
| 2,219,122 | Weidert et al. | Oct. 22, 1940 |
| 2,222,414 | Kudar | Nov. 19, 1940 |
| 2,312,206 | Calbick | Feb. 23, 1943 |
| 2,346,810 | Young | Apr. 18, 1944 |
| 2,364,369 | Jelley et al. | Dec. 5, 1944 |
| 2,388,203 | Zindel | Oct. 30, 1945 |
| 2,419,177 | Steadman | Apr. 15, 1947 |
| 2,432,484 | Moulton | Dec. 9, 1947 |
| 2,461,464 | Aronstein | Feb. 8, 1949 |
| 2,470,666 | Suffield | May 17, 1949 |
| 2,472,988 | Rosenthal | June 14, 1949 |
| 2,476,619 | Nicoll | July 19, 1949 |
| 2,485,561 | Burroughs | Oct. 25, 1949 |
| 2,517,774 | Epstein | Aug. 8, 1950 |
| 2,567,713 | Kaplan | Sept. 11, 1951 |
| 2,582,453 | Pincus | Jan. 15, 1952 |
| 2,612,611 | Szegho | Sept. 30, 1952 |
| 2,680,205 | Burton | June 1, 1954 |

OTHER REFERENCES

Applications of Germicidal Erythemal and Infrared Energy by Luckiesh, pp. 386–397, pub. by D. Van Nostrand Co. Inc., 1946.